US012630117B2

(12) United States Patent
Manickam et al.

(10) Patent No.: US 12,630,117 B2
(45) Date of Patent: May 19, 2026

(54) AUTOMATIC LIFT GATE OPENER USING VEHICULAR REAR CAMERA

(71) Applicant: Magna Electronics Inc., Auburn Hills, MI (US)

(72) Inventors: Karthikeyan Manickam, Rochester Hills, MI (US); Arun Pasupathi, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 687 days.

(21) Appl. No.: 17/661,638

(22) Filed: May 2, 2022

(65) Prior Publication Data

US 2022/0348164 A1 Nov. 3, 2022

Related U.S. Application Data

(60) Provisional application No. 63/201,511, filed on May 3, 2021.

(51) Int. Cl.
| | |
|---|---|
| *B60R 25/25* | (2013.01) |
| *B60R 25/01* | (2013.01) |
| *B60R 25/24* | (2013.01) |
| *B60R 25/30* | (2013.01) |
| *B60R 25/31* | (2013.01) |

(Continued)

(52) U.S. Cl.
CPC .............. *B60R 25/25* (2013.01); *B60R 25/01* (2013.01); *B60R 25/24* (2013.01); *B60R 25/305* (2013.01); *B60R 25/31* (2013.01); *E05F 15/76* (2015.01); *G06V 20/56* (2022.01); *G06V 40/172* (2022.01); *G06V 40/20*

(2022.01); *B60R 2325/205* (2013.01); *E05F 2015/767* (2015.01); *E05Y 2400/44* (2013.01); *E05Y 2400/45* (2013.01);

(Continued)

(58) Field of Classification Search
CPC ......... B60R 25/25; B60R 25/01; B60R 25/24; B60R 25/305; B60R 25/31; B60R 2325/205; E05F 15/76; E05F 2015/767; E05Y 2400/44; E05Y 2400/45; E05Y 2400/858; E05Y 2900/548; G06V 20/56; G06V 40/172; G06V 40/20
See application file for complete search history.

(56) References Cited

U.S. PATENT DOCUMENTS

| | | |
|---|---|---|
| 2,023,845 A | 12/1935 | Larose |
| 2,276,104 A | 3/1942 | Shaunessey |

(Continued)

*Primary Examiner* — Aniss Chad
*Assistant Examiner* — Christine Nguyen Huynh
(74) *Attorney, Agent, or Firm* — HONIGMAN LLP

(57) ABSTRACT

A vehicular vision system includes a camera disposed at a vehicle and viewing rear of the vehicle, and an electronic control unit (ECU) having an image processor for processing image data captured by the camera. The vehicular vision system, responsive to processing by the image processor of image data captured by the camera, determines an individual has moved within a threshold distance of the rear of the vehicle. The vehicular vision system, responsive to determining that the individual has moved within the threshold distance of the vehicle, determines whether the individual is an authorized user of the vehicle. Responsive to at least to determining that the individual is an authorized user of the vehicle, a powered rear lift gate mechanism of the vehicle opens a rear lift gate of the vehicle to allow the user access to the interior of the vehicle.

19 Claims, 3 Drawing Sheets

(51) Int. Cl.

| | |
|---|---|
| *E05F 15/73* | (2015.01) |
| *E05F 15/76* | (2015.01) |
| *G06V 20/56* | (2022.01) |
| *G06V 40/16* | (2022.01) |
| *G06V 40/20* | (2022.01) |

(52) U.S. Cl.
    CPC ... *E05Y 2400/858* (2013.01); *E05Y 2900/548* (2013.01)

(56) References Cited

U.S. PATENT DOCUMENTS

| | | | |
|---|---|---|---|
| 5,371,659 | A | 12/1994 | Pastrick et al. |
| 5,497,305 | A | 3/1996 | Pastrick et al. |
| 5,550,677 | A | 8/1996 | Schofield et al. |
| 5,669,699 | A | 9/1997 | Pastrick et al. |
| 5,670,935 | A | 9/1997 | Schofield et al. |
| 5,823,654 | A | 10/1998 | Pastrick et al. |
| 5,929,769 | A | 7/1999 | Garnault |
| 5,949,331 | A | 9/1999 | Schofield et al. |
| 6,020,855 | A | 2/2000 | Nagy et al. |
| 6,220,737 | B1 | 4/2001 | Baragona |
| 6,349,450 | B1 | 2/2002 | Koops et al. |
| 6,496,107 | B1 | 12/2002 | Himmelstein |
| 6,542,071 | B1 | 4/2003 | Ohtsubo et al. |
| 6,550,103 | B2 | 4/2003 | Koops et al. |
| 6,654,070 | B1 | 11/2003 | Rofe |
| 6,685,347 | B2 | 2/2004 | Grutze |
| 6,690,268 | B2 | 2/2004 | Schofield et al. |
| 7,038,577 | B2 | 5/2006 | Pawlicki et al. |
| 7,175,321 | B1 | 2/2007 | Lopez |
| 7,195,381 | B2 | 3/2007 | Lynam et al. |
| 7,248,151 | B2 | 7/2007 | Mc Call |
| 7,255,451 | B2 | 8/2007 | McCabe et al. |
| 7,289,037 | B2 | 10/2007 | Uken et al. |
| 7,626,749 | B2 | 12/2009 | Baur et al. |
| 7,720,580 | B2 | 5/2010 | Higgins-Luthman |

| | | | | |
|---|---|---|---|---|
| 7,821,388 | B1 | 10/2010 | Booth et al. | |
| 7,855,755 | B2 | 12/2010 | Weller et al. | |
| 8,091,280 | B2 | 1/2012 | Hanzel et al. | |
| 8,154,418 | B2 | 4/2012 | Peterson et al. | |
| 8,519,362 | B2 | 8/2013 | Labrot et al. | |
| 8,801,245 | B2 | 8/2014 | De Wind et al. | |
| 9,068,390 | B2 | 6/2015 | Ihlenburg et al. | |
| 10,071,687 | B2 | 9/2018 | Ihlenburg et al. | |
| 10,099,614 | B2 | 10/2018 | Diessner | |
| 10,589,716 | B2 | 3/2020 | Sobecki et al. | |
| 10,889,265 | B2 | 1/2021 | Sobecki et al. | |
| 11,124,113 | B2 | 9/2021 | Singh | |
| 11,157,729 | B2 * | 10/2021 | Meador | G06V 40/11 |
| 11,427,156 | B2 | 8/2022 | Sobecki et al. | |
| 2002/0152010 | A1 * | 10/2002 | Colmenarez | G06F 18/256 |
| | | | | 340/426.1 |
| 2004/0184282 | A1 | 9/2004 | Nishijima et al. | |
| 2005/0156743 | A1 | 7/2005 | Gallivan et al. | |
| 2006/0145825 | A1 | 7/2006 | Mc Call | |
| 2007/0285510 | A1 | 12/2007 | Lipton et al. | |
| 2008/0122799 | A1 | 5/2008 | Pryor | |
| 2008/0296926 | A1 | 12/2008 | Hanzel et al. | |
| 2010/0253919 | A1 | 10/2010 | Douglas | |
| 2011/0157908 | A1 | 6/2011 | Iwai et al. | |
| 2011/0248820 | A1 | 10/2011 | Gehin | |
| 2011/0273671 | A1 | 11/2011 | Chu | |
| 2012/0020102 | A1 | 1/2012 | Lambert et al. | |
| 2012/0069444 | A1 | 3/2012 | Campbell et al. | |
| 2012/0089273 | A1 | 4/2012 | Seder et al. | |
| 2012/0293462 | A1 | 11/2012 | Backes | |
| 2013/0130674 | A1 | 5/2013 | De Wind et al. | |
| 2014/0039766 | A1 | 2/2014 | Miyake et al. | |
| 2014/0330486 | A1 | 11/2014 | Gehin et al. | |
| 2015/0084739 | A1 | 3/2015 | Lemoult et al. | |
| 2015/0224919 | A1 | 8/2015 | Sobecki et al. | |
| 2017/0241188 | A1 * | 8/2017 | Kalhous | B60J 5/10 |
| 2018/0154864 | A1 | 6/2018 | Kunze et al. | |
| 2019/0055756 | A1 * | 2/2019 | Ducka | E05F 15/77 |
| 2020/0318413 | A1 * | 10/2020 | Zarders | E05F 15/76 |

* cited by examiner

AUTOMATIC LIFT GATE OPENER USING VEHICULAR REAR CAMERA

CROSS REFERENCE TO RELATED APPLICATION

The present application claims the filing benefits of U.S. provisional application Ser. No. 63/201,511, filed May 3, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein include a vehicular vision system that includes a camera disposed at a vehicle equipped with the vehicular vision system that views rearward of the vehicle and captures image data. The camera may include a CMOS imaging array with at least one million photosensors arranged in rows and columns. The system includes an electronic control unit (ECU) with electronic circuitry and associated software. The electronic circuitry of the ECU includes an image processor for processing image data captured by the camera. The vehicular vision system, responsive to processing by the image processor of image data captured by the camera, detects presence of an individual within a threshold distance from the rear of the vehicle. The vehicular vision system, responsive to detection of the individual within the threshold distance of the vehicle, and based at least in part on processing at the ECU image data captured by the camera, determines whether the individual is an authorized user of the vehicle. Responsive at least to the vehicular vision system determining that the individual is an authorized user of the vehicle, a powered rear lift gate mechanism of the vehicle opens a rear lift gate of the vehicle to allow the user access to the interior of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
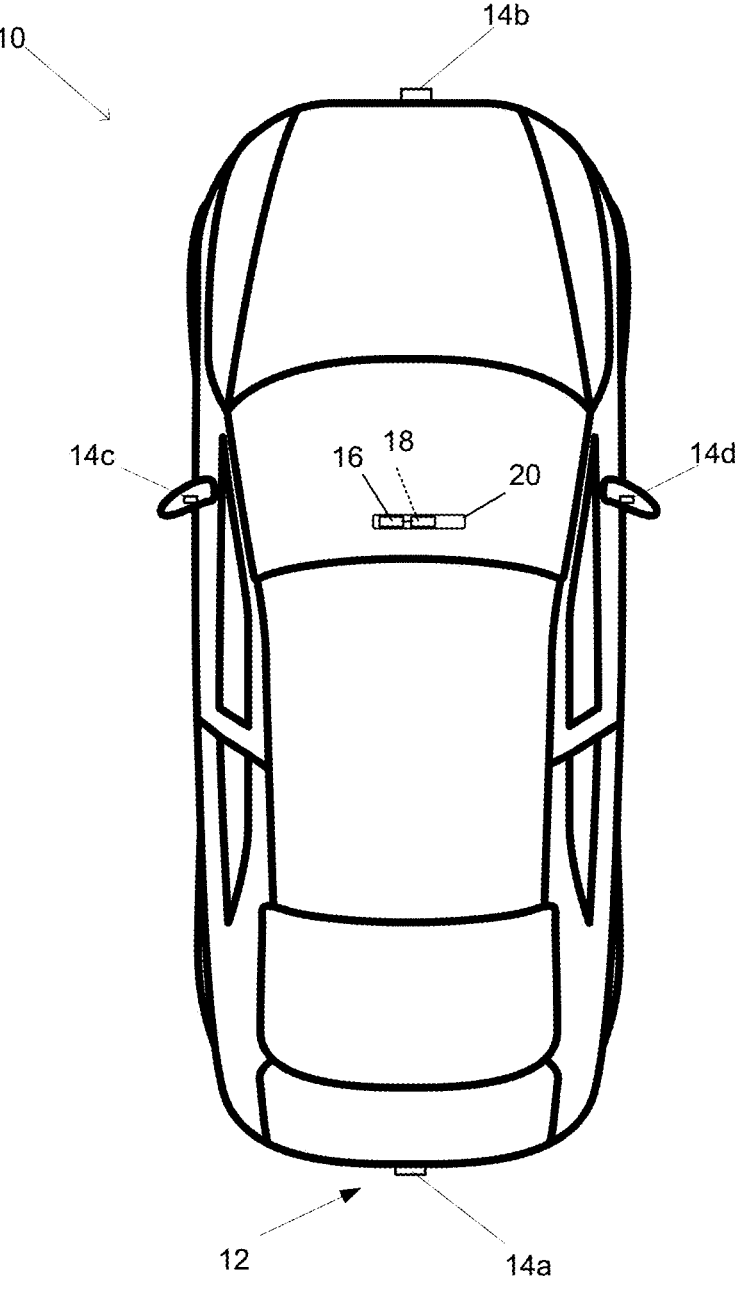
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or display device may be disposed elsewhere at or in the vehicle). The data transfer or signal communication from the camera to the ECU may comprise any suitable data or communication link, such as a vehicle network bus or the like of the equipped vehicle.

Powered rear lift gates are a popular feature in modern vehicles. These powered lift gates allow users to open and close the rear lift gate or trunk of a vehicle without the need of manually maneuvering the lift gate, and thus allows for use when, for example, the user's hands are full (e.g., carrying groceries). Implementations herein include an automatic powered lift gate opener that uses a vehicular rearview camera to detect or determine a presence of an authorized operator of the vehicle.

Figure 2:
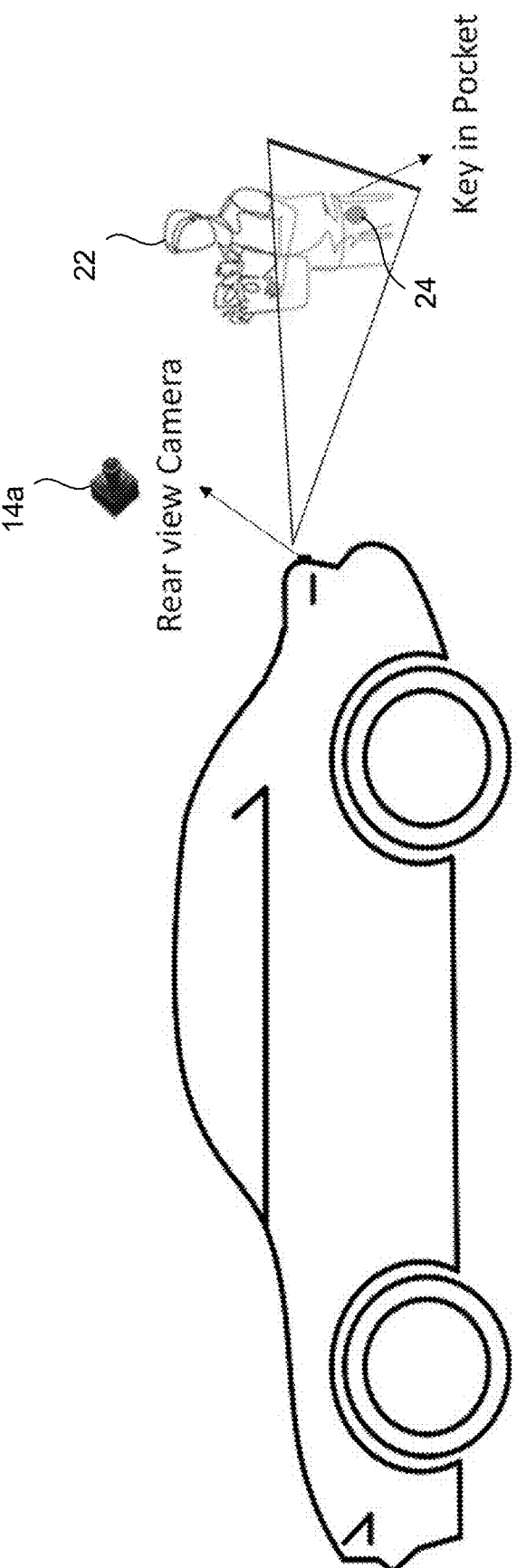
FIG. 2 is a plan view of the vision system of FIG. 1 determining a presence of an authorized operator of the vehicle.

Referring now to FIG. 2, the system determines a presence of a user 22 authorized to operate or access the trunk space and/or interior of the vehicle. For example, the ECU may determine that an individual 22 is within a threshold distance behind the vehicle by processing image data captured by the camera (such as a rearward viewing camera 14a disposed at a rear portion of the vehicle and viewing at least rearward of the vehicle, such as a rear backup camera of the vehicle). Optionally, the camera and/or system remains in a low-power state (e.g., with a reduced rate of image capturing and/or processing of captured image data) until a wake trigger is received. The wake trigger may be generated when, for example, movement is detected within the field of view of the camera, movement is detected by an ultrasonic sensor, a mobile device (e.g., a key fob, mobile phone, etc.) is detected (e.g., via NFC, BLUETOOTH, WIFI, etc.), and/or any other appropriate sensor determines an individual is within a threshold distance of the rear of the vehicle. When the wake trigger is received, the system and/or camera enters an awake or high-powered mode (e.g., with an increased rate of image capturing and/or processing of the image data). When the ECU determines (via the processing of the image data captured by the rearward viewing camera) that an individual is within the threshold distance of the vehicle (e.g., within three feet of the rear bumper of the vehicle), the ECU may determine whether the individual is authorized to access the trunk or rear storage space of the vehicle.

Optionally, the ECU determines the individual is authorized based on detection of a device 24 (e.g., via NFC, BLUETOOTH, etc.) carried by the individual. For example, the individual may carry a key fob or a mobile phone executing an authenticated application that allows the individual to access the vehicle. In other examples, the ECU determines that the individual is authorized to access the vehicle using the captured image data. For example, the ECU uses facial recognition to determine an identity of the individual and then determines whether the identity of the individual matches an identity authorized to access to the vehicle. The ECU may access a database at the vehicle or remote from the vehicle (via wireless communication) that stores a list of identities of users authorized to access the vehicle. Optionally, the ECU may determine that the individual is an authorized user of the vehicle based on a predetermined motion that the individual performs. For example, the user may make a gesture (e.g., holding up a predetermined number of fingers, waving an arm or elbow, raising a leg, etc.) or other action that the ECU determines is associated with an authorized user of the vehicle. The system may require any combination of these actions or devices before authorizing a user. For example, the system may require that the user be in possession of an authenticated device and perform a specific gesture.

Figure 3:
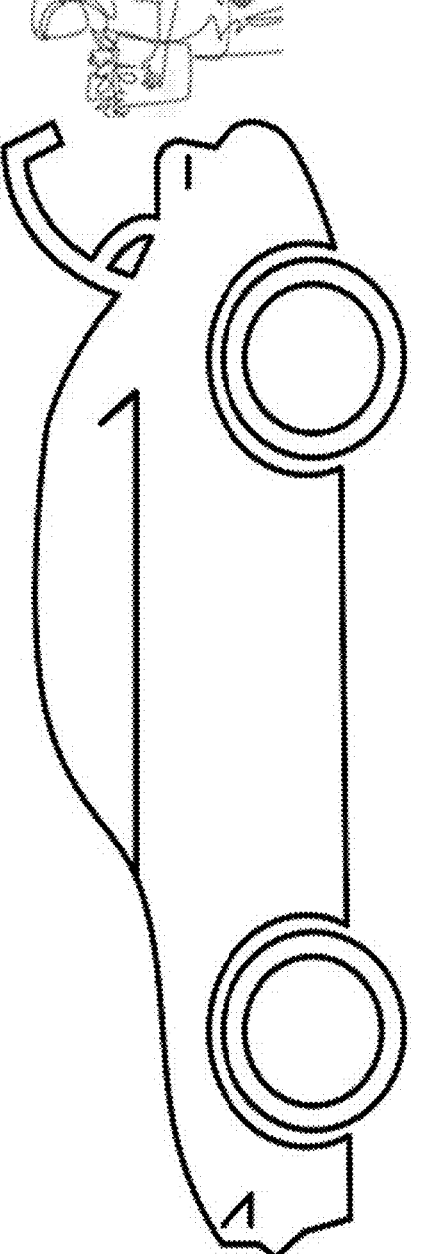
FIG. 3 is a plan view of the vision system of FIG. 1 opening a lift gate of the vehicle in response to determining the presence of the authorized operator of the vehicle.

Referring now to FIG. 3, when the individual is within the threshold distance of the rear of the vehicle and ECU determines that the individual is authorized to access the vehicle, the ECU may command the rear lift gate (or rear door or tailgate or decklid or the like) to open. Optionally, the ECU waits for a signal from the authorized user prior to opening the lift gate. For example, the user may make an action, such as a predetermined motion with an arm (e.g., a wave) or a leg (e.g., raise the leg closer to the camera) indicating a desire or intent for the lift gate to open. The ECU may also automatically close the lift gate after the user is, for example, done loading the rear of the vehicle and is moving away from the vehicle. For example, based at least in part on processing of the captured image data, the ECU may determine that the user has moved beyond a threshold distance from the vehicle and/or made a predetermined motion indicating a desire for the lift gate to close, and may activate the lift gate mechanism to close the lift gate.

Optionally, the system may determine whether a user is authorized when the user is a first threshold distance from the vehicle via any of the means discussed above. The system may then subsequently (i.e., after the user is authorized) determine that the authorized user desires the rear lift gate to open. For example, when the authorized user moves from the first threshold distance from the vehicle to a second threshold distance from the rear of the vehicle (e.g., the authorized user continues to move toward the trunk of the vehicle), the authorized user performs a specific gesture, the user performs a specific gesture at a specific location, the authorized user stands at a specific location (e.g., at the rear of the vehicle) for a threshold period of time, the user's arms are full, etc. (e.g., 3 seconds), the system determines that the authorized user desires the rear lift gate to open and opens the rear lift gate.

The system may be configured by the user. For example, the user may place the system in a record mode and perform the actions (e.g., perform one or more gestures within view of the rear view camera) that the user desires to perform when commanding the rear lift gate to open. The system may record the actions and compare subsequent actions performed by users against the recorded actions, and when the subsequent actions are determined to correspond (such as within a threshold amount) to the recorded actions, the system determines that the authorized user desires the rear lift gate or deck lid to open and opens the rear lift gate or deck lid. Optionally, the system may provide the user with a selection of different predetermined actions the user may perform to open the rear lift gate.

Thus, the automatic lift gate system uses image data captured by a rearward viewing camera to at least partially determine when to open and/or close a powered lift gate. Because vehicles are typically equipped with a rearward viewing camera, such as a rear backup camera, the system may avoid the need to install additional sensors (e.g., ultrasonic sensors) to help control the lift gate. The system may first determine a presence of an individual using image data captured by the camera and then determine whether the individual is authorized to access the vehicle and/or desires the lift gate to open. Although described herein as operating a rear lift gate based on image processing of image data captured by the rearward viewing camera, the system may operate other doors of a vehicle, such as a rear door or tailgate or decklid of a vehicle, or the system may operate a side door of a vehicle, such as a powered slider side door of a vehicle, responsive to image processing of a sideward viewing camera of the vehicle. The system thus may operate in conjunction with the existing rear backup camera of the vehicle, and/or may operate in conjunction with a surround view camera system of the vehicle, such that additional sensors are not needed to provide the automatic control of the lift gate or other door of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least one million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687;

9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera disposed at a vehicle equipped with the vehicular vision system, wherein the camera views rearward of the vehicle, the camera capturing image data;
   wherein the camera comprises a CMOS imaging array, and wherein the CMOS imaging array comprises at least one million photosensors arranged in rows and columns;
   an electronic control unit (ECU) comprising electronic circuitry and associated software;
   wherein the electronic circuitry of the ECU comprises an image processor for processing image data captured by the camera;
   wherein the vehicular vision system, responsive to processing by the image processor of image data captured by the camera, detects presence of an individual within a threshold distance from the rear of the vehicle;
   wherein the vehicular vision system, responsive to detection of the individual within the threshold distance of the vehicle, and based at least in part on processing at the ECU image data captured by the camera, determines a gesture performed by the individual;
   wherein the vehicular vision system, responsive to determining the gesture performed by the individual, determines whether the individual is an authorized user of the vehicle; and
   wherein, responsive at least to the vehicular vision system determining that the individual is an authorized user of the vehicle, a powered rear lift gate mechanism of the vehicle opens a rear lift gate of the vehicle to allow the user access to the interior of the vehicle.

2. The vehicular vision system of claim 1, wherein the vehicular vision system determines that the individual is an authorized user of the vehicle based further on facial recognition via processing at the ECU of image data captured by the camera.

3. The vehicular vision system of claim 1, wherein the vehicular vision system, responsive to determining that the individual is an authorized user of the vehicle and responsive to detecting, via processing at the ECU of image data captured by the camera, a predetermined motion from the authorized user, operates the powered rear lift gate mechanism of the vehicle.

4. The vehicular vision system of claim 1, wherein the vehicular vision system, responsive to at least determining that the authorized user is within a second threshold distance of the vehicle, operates the powered rear lift gate mechanism of the vehicle to close the rear lift gate.

5. The vehicular vision system of claim 1, wherein the vehicular vision system, responsive to determining that the individual is an authorized user of the vehicle, determines an intent of the authorized user to access the interior of the vehicle, and wherein the vehicular vision system operates the powered rear lift gate mechanism of the vehicle responsive at least to determining the intent of the authorized user to access the interior of the vehicle.

6. The vehicular vision system of claim 5, wherein the vehicular vision system determines the intent of the authorized user of the vehicle to access the interior of the vehicle based on determining, via processing at the ECU of image data captured by the camera, a second gesture performed by the authorized user.

7. The vehicular vision system of claim 5, wherein the vehicular vision system determines the intent of the authorized user of the vehicle to access the interior of the vehicle based on determination of, via processing at the ECU of image data captured by the camera, a location the authorized user stands at for a threshold period of time.

8. The vehicular vision system of claim 1, wherein the vehicular vision system determines that the individual is an authorized user of the vehicle based in part on detecting that the individual is in possession of a user device.

9. The vehicular vision system of claim 8, wherein the user device is a key fob or a mobile phone.

10. The vehicular vision system of claim 1, wherein the camera comprises a rear backup camera of the vehicle.

11. A vehicular vision system, the vehicular vision system comprising:

a camera disposed at a vehicle equipped with the vehicular vision system, wherein the camera views rearward of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera;

wherein the vehicular vision system, responsive to processing by the image processor of image data captured by the camera, detects presence of an individual within a threshold distance from the rear of the vehicle;

wherein the vehicular vision system, responsive to detection of the individual within the threshold distance of the vehicle, and based at least in part on processing at the ECU image data captured by the camera, determines a gesture performed by the individual;

wherein the vehicular vision system, responsive to determining the gesture performed by the individual, determines whether the individual is an authorized user of the vehicle;

wherein the vehicular vision system, responsive at least to the vehicular vision system determining that the individual is an authorized user of the vehicle and based at least in part on processing at the ECU image data captured by the camera, determines an action of the authorized user that is indicative of intent of the authorized user to open the rear lift gate; and wherein, responsive to determining the action of the authorized user that is indicative of intent of the authorized user to open the rear lift gate, a powered rear lift gate mechanism of the vehicle opens a rear lift gate of the vehicle to allow the user access to the interior of the vehicle.

12. The vehicular vision system of claim 11, wherein the vehicular vision system determines that the individual is an authorized user of the vehicle based on facial recognition via processing at the ECU of image data captured by the camera.

13. The vehicular vision system of claim 11, wherein the vehicular vision system determines the action of the authorized user that is indicative of intent of the authorized user to open the rear lift gate at least responsive to determining that the authorized user has moved within a second threshold distance of the vehicle.

14. The vehicular vision system of claim 11, wherein the vehicular vision system determines the action of the authorized user that is indicative of intent of the authorized user of the vehicle to open the rear lift gate based on determining, via processing at the ECU of image data captured by the camera, a second gesture performed by the authorized user.

15. The vehicular vision system of claim 11, wherein the vehicular vision system determines the action of the authorized user that is indicative of intent of the authorized user of the vehicle to open the rear lift gate based on determination of, via processing at the ECU of image data captured by the camera, a location the authorized user stands at for a threshold period of time.

16. A vehicular vision system, the vehicular vision system comprising:

a camera disposed at a vehicle equipped with the vehicular vision system, wherein the camera views rearward of the vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera;

wherein the vehicular vision system, responsive to processing by the image processor of image data captured by the camera, detects presence of an individual within a threshold distance from the rear of the vehicle;

wherein the vehicular vision system, responsive to detection of the individual within the threshold distance of the vehicle, and based at least in part on processing at the ECU image data captured by the camera, determines a first gesture performed by the individual;

wherein the vehicular vision system, responsive to determining the first gesture performed by the individual, determines whether the individual is an authorized user of the vehicle using facial recognition;

wherein the vehicular vision system, responsive to determining that the individual is an authorized user of the vehicle and based at least in part on processing at the ECU image data captured by the camera, determines that the authorized user has performed a second gesture; and wherein, responsive to determining that the authorized user performs the second gesture, a powered rear lift gate mechanism of the vehicle opens a rear lift gate of the vehicle to allow the user access to the interior of the vehicle.

17. The vehicular vision system of claim 16, wherein the vehicular vision system determines that the individual is an authorized user of the vehicle based in part on detecting that the individual is in possession of a user device.

18. The vehicular vision system of claim 17, wherein the user device is a key fob or a mobile phone.

19. The vehicular vision system of claim 16, wherein the camera comprises a rear backup camera of the vehicle.

* * * * *